US005961824A

United States Patent [19]

Caiozza

[11] Patent Number: 5,961,824
[45] Date of Patent: *Oct. 5, 1999

[54] METAL PARTICLE REMOVAL AND RETENTION APPARATUS

[76] Inventor: Joseph Caiozza, 321 W. Market St., Long Beach, N.Y. 11561

[ * ] Notice: This patent is subject to a terminal disclaimer.

[21] Appl. No.: 08/995,930

[22] Filed: Dec. 22, 1997

[51] Int. Cl.[6] .................... B01D 35/06

[52] U.S. Cl. .................... 210/222; 210/440; 210/444; 210/249; 210/282; 184/6.25

[58] Field of Search .................... 210/222, 223, 210/695, 232, 440, 444, 450, 238, DIG. 17, 249, 282; 184/6.25; 335/304

[56] References Cited

U.S. PATENT DOCUMENTS

| | | | |
|---|---|---|---|
| 3,618,777 | 11/1971 | Meyer | 210/130 |
| 5,114,572 | 5/1992 | Hunter et al. | 210/120 |
| 5,510,024 | 4/1996 | Caiozza | 210/186 |
| 5,714,063 | 2/1998 | Brunsting | 210/222 |
| 5,785,870 | 7/1998 | Davis et al. | 210/798 |
| 5,879,549 | 3/1999 | Caiozza | 210/186 |

*Primary Examiner*—W. L. Walker
*Assistant Examiner*—Terry K. Cecil

[57] ABSTRACT

An improved metal particle removal and retention apparatus includes a canister-retention bracket, a liquid inlet channel connected to the canister-retention bracket, a liquid outlet channel connected to the canister-retention bracket, and a canister assembly connected to the canister-retention bracket. The canister assembly is in communication with the liquid inlet channel and the liquid outlet channel, and a plurality of magnet attachment assemblies are attached to the canister assembly. The canister assembly includes a plurality of interior particle-reception pans attached to a plurality of interior pan-reception portions of the canister housing. The interior pan-reception portions are in registration with the exterior magnet-attachment-reception portions. An outflow tube is connected to the canister-retention bracket and is in communication with the liquid outlet channel. The outflow tube includes a plurality of oil receiving apertures. A plurality of interior funnel elements are connected to the outflow tube at the respective oil receiving apertures. Each of the funnel elements includes a relatively large diameter first end opening positioned adjacent to a respective particle-reception pan and is in communication with an inside region of the canister housing. Also, each of the funnel elements includes a relatively small diameter second end opening in communication with a respective oil receiving aperture. A plurality of plug members are provided for reception in the oil receiving apertures, wherein each of the plug members is selectively employed for plugging a respective oil receiving aperture.

17 Claims, 4 Drawing Sheets

FIG 4
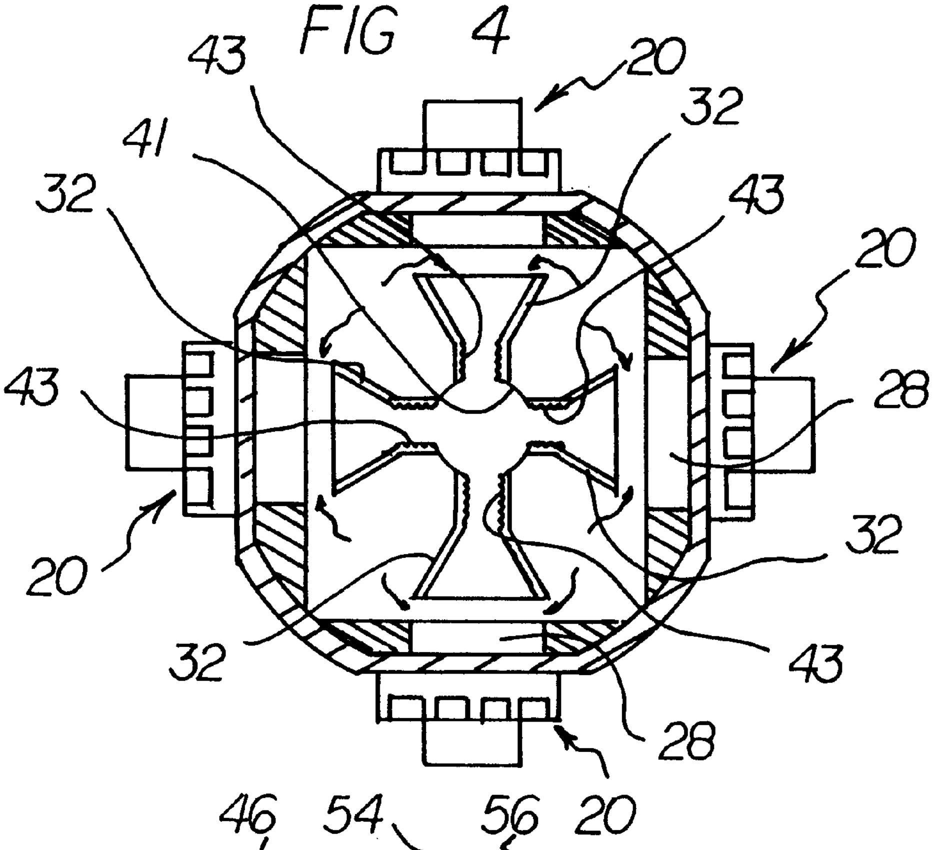
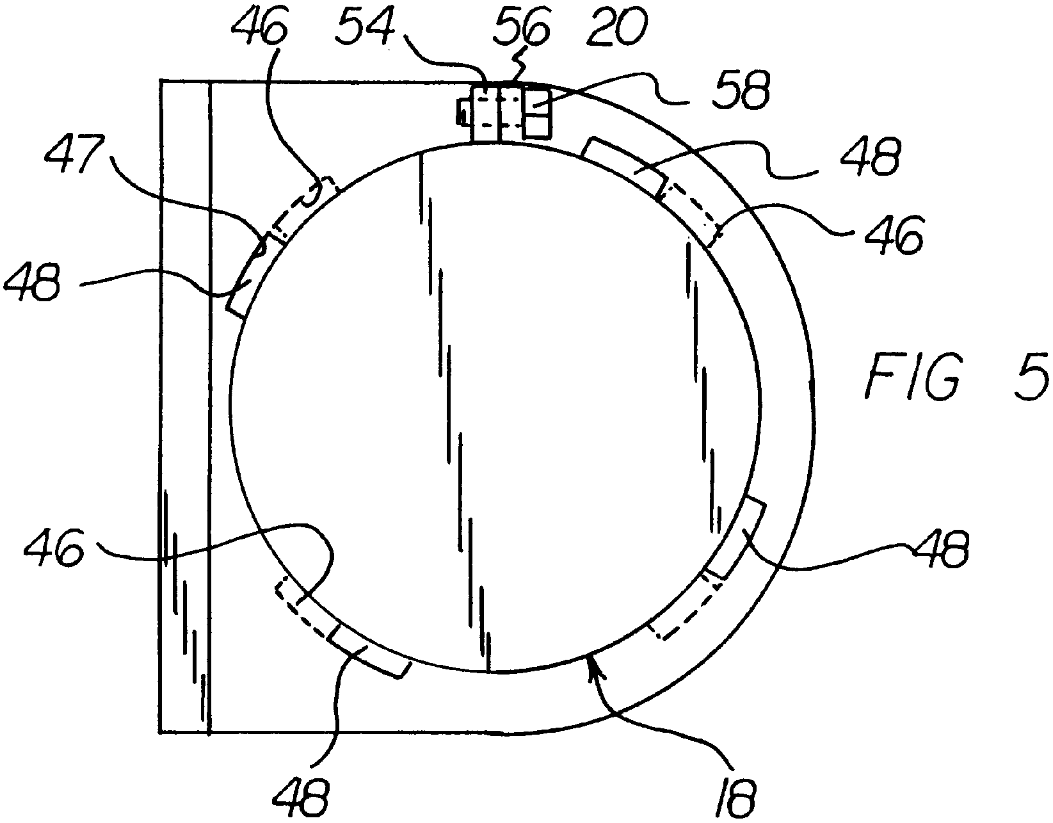
FIG 5

METAL PARTICLE REMOVAL AND RETENTION APPARATUS

BACKGROUND OF THE INVENTION

1. Field of the Invention

The present invention relates generally to fluid clarification systems and, more particularly, to an apparatus especially adapted for removing metal particles from the oil in oil lubrication systems of internal combustion engines.

2. Description of the Prior Art

Magnetic attachments for an oil filter cartridge for an internal combustion engine are disclosed in U.S. Pat. No. 5,510,024 by the present inventor herein. Additional magnetic attachments for an oil cartridge are disclosed in U.S. Pat. No. 5,879,549 entitled IMPROVED FILTER CARTRIDGE MAGNETIC ATTACHMENT, also by the same inventor. Such additional magnetic attachments employ shunt elements and shunt magnets. Still additional magnetic attachments for an oil cartridge are disclosed in U.S. patent application entitled METAL PARTICLE REMOVAL AND RETENTION APPARATUS, Ser. No. 08/929,336, filed Sep. 13, 1997 (Attorney Docket 2917M), now allowed, also by the same inventor, in which a canister assembly includes an interior particle-reception pan attached to an interior pan-reception portion of a canister housing. The interior pan-reception portion is in registration with an exterior magnet-attachment-reception portion. A relatively large diameter first end opening of an interior funnel element is placed in registration with the interior particle-reception pan and the magnet attachment assembly. Although the benefits of using such above-mentioned magnetic attachments for oil cartridges are substantial, it may be desirable to provide even greater oil clarification than provided by such magnetic attachments alone. In this respect, it would be desirable if means were provided for obtaining greater clarification of oil than provided by the magnetic attachments to filter cartridges such as disclosed in U.S. Pat. Nos. 5,510,024, 5,879,549, and U.S. patent application Ser. No. 08/929,336, now allowed, filed Sep. 13, 1997. For example, to increase magnetic particle removal from oil, it would be desirable if an oil filter cartridge were provided that had plural magnet attachment assemblies, plural interior particle-reception pans, and plural interior funnel elements.

With a conventional oil filtration system for an internal combustion engine, oil is pumped from an oil pump to a filter cartridge. Particles which are trapped by the filter cartridge inevitably tend to clog the filter causing oil flow to be impeded. To reduce such filter cartridge clogging, it would be desirable if an auxiliary oil filtering device were placed between the oil pump and the filter cartridge.

Once particles are trapped by a filter, there is always a tendency for some of the trapped particles to be dislodged and reenter the oil flow. In this respect, it would be desirable if an oil filtering device were provided that reduces the tendency of trapped particles from becoming dislodged and reentering the oil flow.

For an auxiliary oil filtering device, it would be desirable if means were provided for readily attaching the auxiliary oil filtering device to the body of a motor vehicle.

In a device wherein metal particles in flowing oil are attracted to a magnet, to assure effectiveness of the magnet in attracting the metal particles, it would be desirable if the oil flow were reduced in the flow region wherein the magnetic lines of force of the magnet are most concentrated. The slower the oil flow rate in the region of the magnetic lines of force, the greater effectiveness of the magnet for removing metal particles from the flowing oil.

Some internal combustion engines have hoses or metal lines through which lubricating oil flows. With such internal combustion engines it would be desirable if an auxiliary oil filtering device could be spliced into such an oil hose or metal line through which lubricating oil flows.

An auxiliary oil filtering device, that is used in addition to a filter cartridge, can also employ magnetic means for attracting and retaining metal particles. It is recalled that U.S. Pat. Nos. 5,510,024, 5,879,549, and U.S. patent application Ser. No. 08/929,336, now allowed, filed Sep. 13, 1997 disclose magnetic attachments for oil filter cartridges. In this respect, it would be desirable if an auxiliary oil filtering device could also employ magnetic attachments such as disclosed in U.S. Pat. Nos. 5,510,024, 5,879,549, and U.S. patent application Ser. No. 08/929,336, now allowed, filed Sep. 13, 1997.

Thus, while the foregoing discussion indicates it to be well known to use magnetic attachments to oil filter cartridges, there is no teaching or suggestion of a metal particle removal and retention apparatus which has the following combination of desirable features: (1) provides for obtaining greater clarification of oil than provided by the magnetic attachments to filter cartridges such as disclosed in U.S. Pat. Nos. 5,510,024 and 5,879,549, (2) provides an auxiliary oil filtering device which is placed between an oil pump and an oil filter cartridge; (3) reduces the tendency of trapped particles from becoming dislodged and reentering the oil flow; (4) provides for readily attaching the auxiliary oil filtering device to the body of a motor vehicle; (5) reduces the oil flow in a flow region wherein the magnetic lines of force of a magnet are most concentrated; (6) provides an auxiliary oil filtering device which can be spliced into an oil hose or metal line through which lubricating oil flows; (7) provides an auxiliary oil filtering device which employs magnetic means for attracting and retaining metal particles; (8) provides an auxiliary oil filtering device which can employ magnetic attachments such as disclosed in U.S. Pat. Nos. 5,510,024, 5,879,549, and U.S. patent application Ser. No. 08/929,336, now allowed, filed Sep. 13, 1997; and (9) provides plural magnet attachment assemblies, plural interior particle-reception pans, and plural interior funnel elements. The foregoing desired characteristics are provided by the unique metal particle removal and retention apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides an improved metal particle removal and retention apparatus which includes a canister-retention bracket, a liquid inlet channel connected to the canister-retention bracket, a liquid outlet channel connected to the canister-retention bracket, and a canister assembly connected to the canister-retention bracket. The canister assembly is in communication with the liquid inlet channel and the liquid outlet channel, and a plurality of magnet attachment assemblies attached to the canister assembly. The canister assembly includes a canister housing which includes a plurality of exterior magnet-attachment-reception portions which receive the respective magnet attachment assemblies. The canister assembly includes a plurality of interior particle-reception pans attached to a plurality of interior pan-reception portions of the canister housing. The interior pan-reception portions are in registration with the exterior magnet-attachment-reception portions. An outflow tube is connected to the canister-retention bracket, and the outflow tube is in communication with the liquid outlet channel. The outflow tube defines an outflow reception chamber contained within the canister housing. The outflow tube includes a plurality of oil receiving apertures. A plurality of interior funnel elements are connected to the outflow tube at the respective oil receiving apertures. Each of the funnel elements includes a relatively large diameter first end opening positioned adjacent to a respective particle-reception pan and is in communication with an inside region of the canister housing. Also, each of the funnel elements includes a relatively small diameter second end opening in communication with a respective oil receiving aperture.

Each of the relatively large diameter first end openings of the respective funnel elements is spaced from a respective particle-reception pan by a separation distance.

A plurality of plug members are provided for reception in the oil receiving apertures, wherein each of the plug members is selectively employed for plugging a respective oil receiving aperture. Each of the oil receiving apertures is internally threaded, and each of the plug members is externally threaded.

The canister-retention bracket includes the liquid inlet channel and the liquid outlet channel integrated into the canister-retention bracket. A liquid inlet chamber within the canister-retention bracket is connected to the liquid inlet channel. A liquid outlet chamber within the canister-retention bracket is connected to the liquid outlet channel. A canister bypass channel is in the canister-retention bracket and is connected between the liquid inlet chamber and the liquid outlet chamber.

A canister bypass valve assembly is contained within the canister bypass channel for controlling liquid flow through the canister bypass channel between the liquid inlet chamber and the liquid outlet chamber. The canister bypass valve assembly includes a valve seat formed in the canister bypass channel. A check valve is present adjacent to the valve seat, and a bias spring, contained in the canister bypass channel, is in contact with the check valve urging the check valve against the valve seat. The canister assembly is selectively connectable to and removable from the canister-retention bracket.

A canister connector is attached to the canister-retention bracket and is selectively used for connecting the canister assembly to and removing the canister assembly from the canister-retention bracket. The canister connector includes a plurality of flange-reception channels in the canister-retention bracket.

The canister assembly includes a plurality of connection flanges that are received in the flange-reception channels. A clamp assembly is provided for clamping the canister assembly to the canister-retention bracket. The connection flanges are distributed around a circumferential top edge of the canister assembly. The flange-reception channels are distributed on the canister-retention bracket is a circular pattern. The flange-reception channels are registrable with the connection flanges. Each of the flange-reception channels has a circular length which is at least twice a circular length of a respective connection flange. Each of the flange-reception channels includes an open flange-reception portion for receiving a respective connection flange and a closed flange reception portion for securing the respective connection flange to the canister-retention bracket.

The clamp assembly includes a first clamp tang projecting from the canister-retention bracket. A second clamp tang projects from the canister housing. The first clamp tang and the second clamp tang are in registration when the canister-retention bracket and the canister assembly are connected together with a sealed connection. A clamping screw is provided for bonding the first clamp tang and the second clamp tang together to retain the canister-retention bracket and the canister assembly together in a sealed connection.

A sealing ring is placed between the canister assembly and the canister-retention bracket for providing a seal between the canister assembly and the canister-retention bracket.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved metal particle removal and retention apparatus which has all of the advantages of the prior art and none of the disadvantages.

It is another object of the present invention to provide a new and improved metal particle removal and retention apparatus which may be easily and efficiently manufactured and marketed.

It is a further object of the present invention to provide a new and improved metal particle removal and retention apparatus which is of durable and reliable construction.

An even further object of the present invention is to provide a new and improved metal particle removal and retention apparatus which is susceptible of a low cost of manufacture with regard to both materials and labor, and which accordingly is then susceptible of low prices of sale to the consuming public, thereby making such metal particle removal and retention apparatus available to the buying public.

Still yet a further object of the present invention is to provide a new and improved metal particle removal and retention apparatus which provides for obtaining greater clarification of oil than provided by the magnetic attachments to filter cartridges such as disclosed in U.S. Pat. Nos. 5,510,024 and 5,879,549.

Still another object of the present invention is to provide a new and improved metal particle removal and retention apparatus that provides an auxiliary oil filtering device which is placed between an oil pump and an oil filter cartridge.

Yet another object of the present invention is to provide a new and improved metal particle removal and retention apparatus which reduces the tendency of trapped particles from becoming dislodged and reentering the oil flow.

Even another object of the present invention is to provide a new and improved metal particle removal and retention apparatus that provides for readily attaching the auxiliary oil filtering device to the body of a motor vehicle.

Still a further object of the present invention is to provide a new and improved metal particle removal and retention apparatus which reduces the oil flow in a flow region wherein the magnetic lines of force of a magnet are most concentrated.

Yet another object of the present invention is to provide a new and improved metal particle removal and retention apparatus that provides an auxiliary oil filtering device which can be spliced into an oil hose or metal line through which lubricating oil flows.

Still another object of the present invention is to provide a new and improved metal particle removal and retention apparatus which provides an auxiliary oil filtering device which employs magnetic means for attracting and retaining metal particles.

Yet another object of the present invention is to provide a new and improved metal particle removal and retention apparatus that provides an auxiliary oil filtering device which can employ magnetic attachments such as disclosed in U.S. Pat. Nos. 5,510,024 and 5,879,549.

Still another object of the present invention is to provide a new and improved metal particle removal and retention apparatus that provides an auxiliary oil filtering device which provides plural magnet attachment assemblies, plural interior particle-reception pans, and plural interior funnel elements.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 4 is a cross-sectional view of the embodiment of the metal particle removal and retention apparatus of FIG. 3 taken along line 4—4 thereof.

FIG. 5 is a bottom view of the embodiment of the invention shown in FIG. 1 taken along line 5—5 thereof.

DESCRIPTION OF THE PREFERRED EMBODIMENT

With reference to the drawings, a new and improved metal particle removal and retention apparatus embodying the principles and concepts of the present invention will be described.

Figure 1:
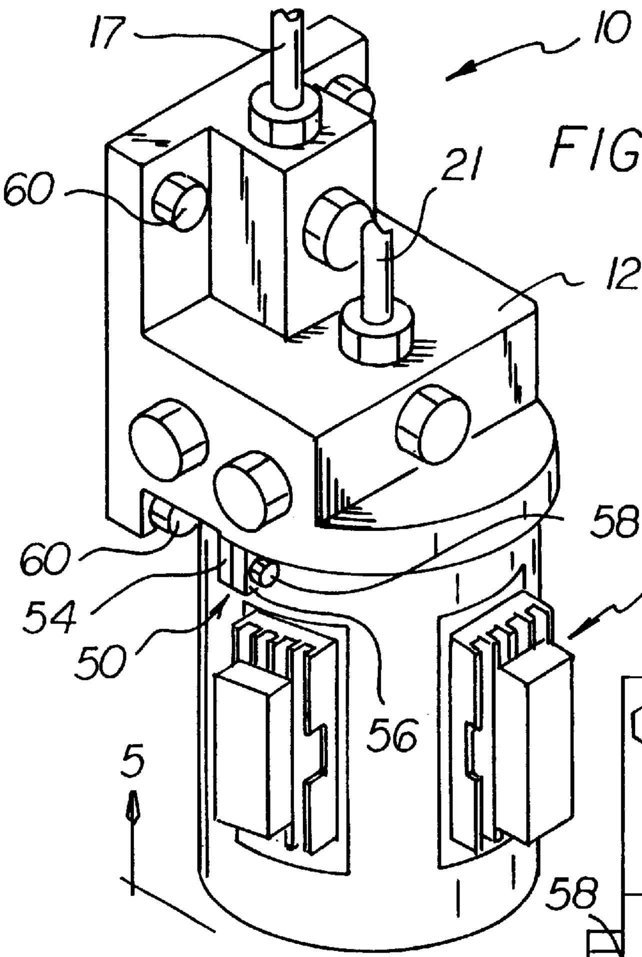
FIG. 1 is a perspective view showing a preferred embodiment of the metal particle removal and retention apparatus of the invention connected to oil lines connected to an internal combustion engine.
Figure 2:
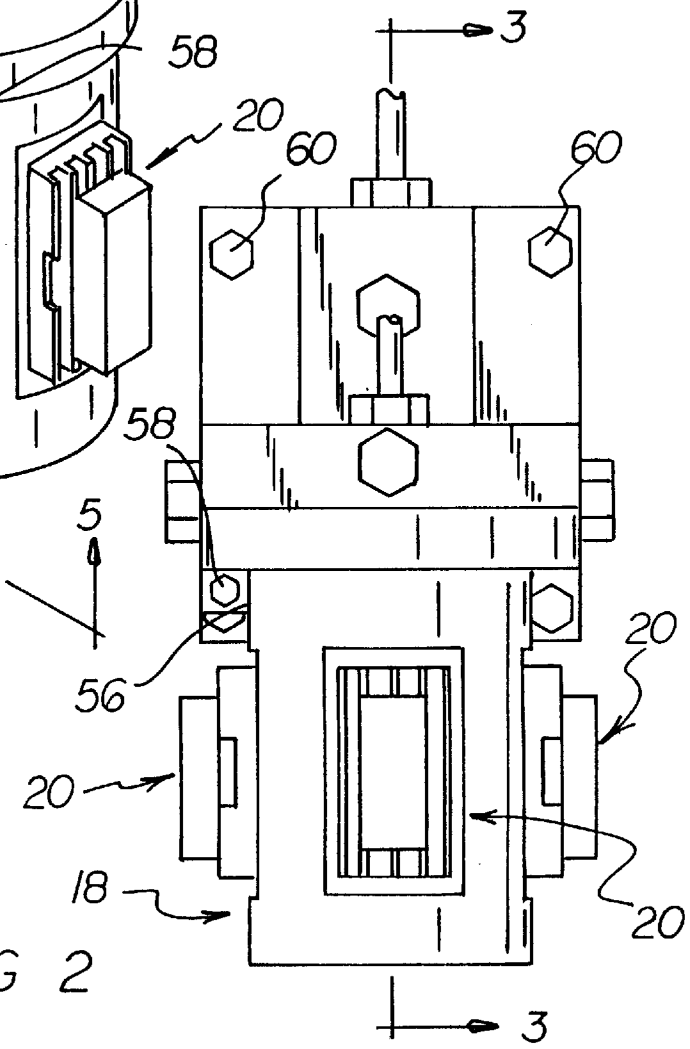
FIG. 2 is a front view of the embodiment of the metal particle removal and retention apparatus shown in FIG. 1.
Figure 3:
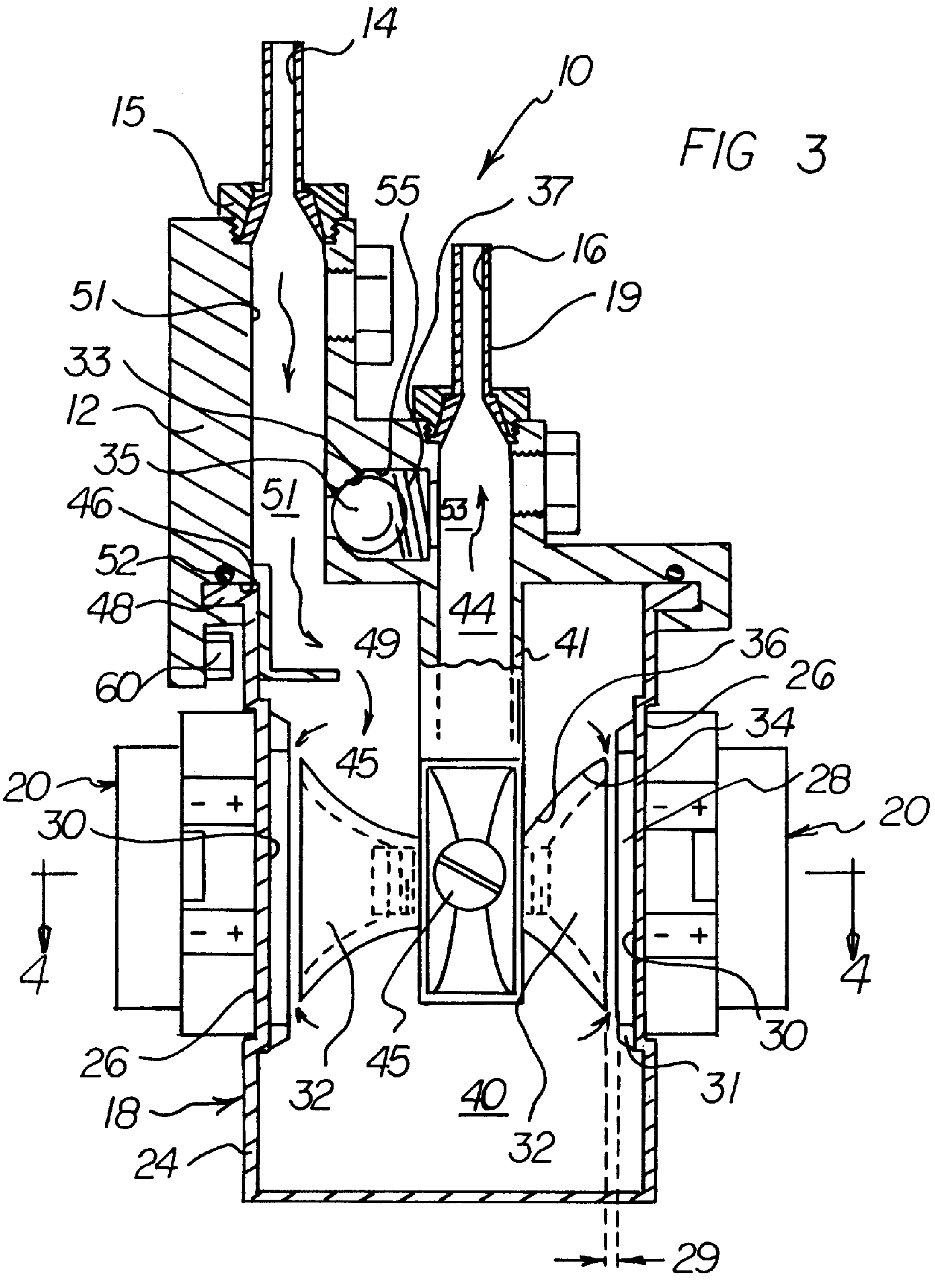
FIG. 3 is a cross-sectional view of the embodiment of the metal particle removal and retention apparatus of FIG. 2 taken along line 3—3 thereof.
Figure 6:
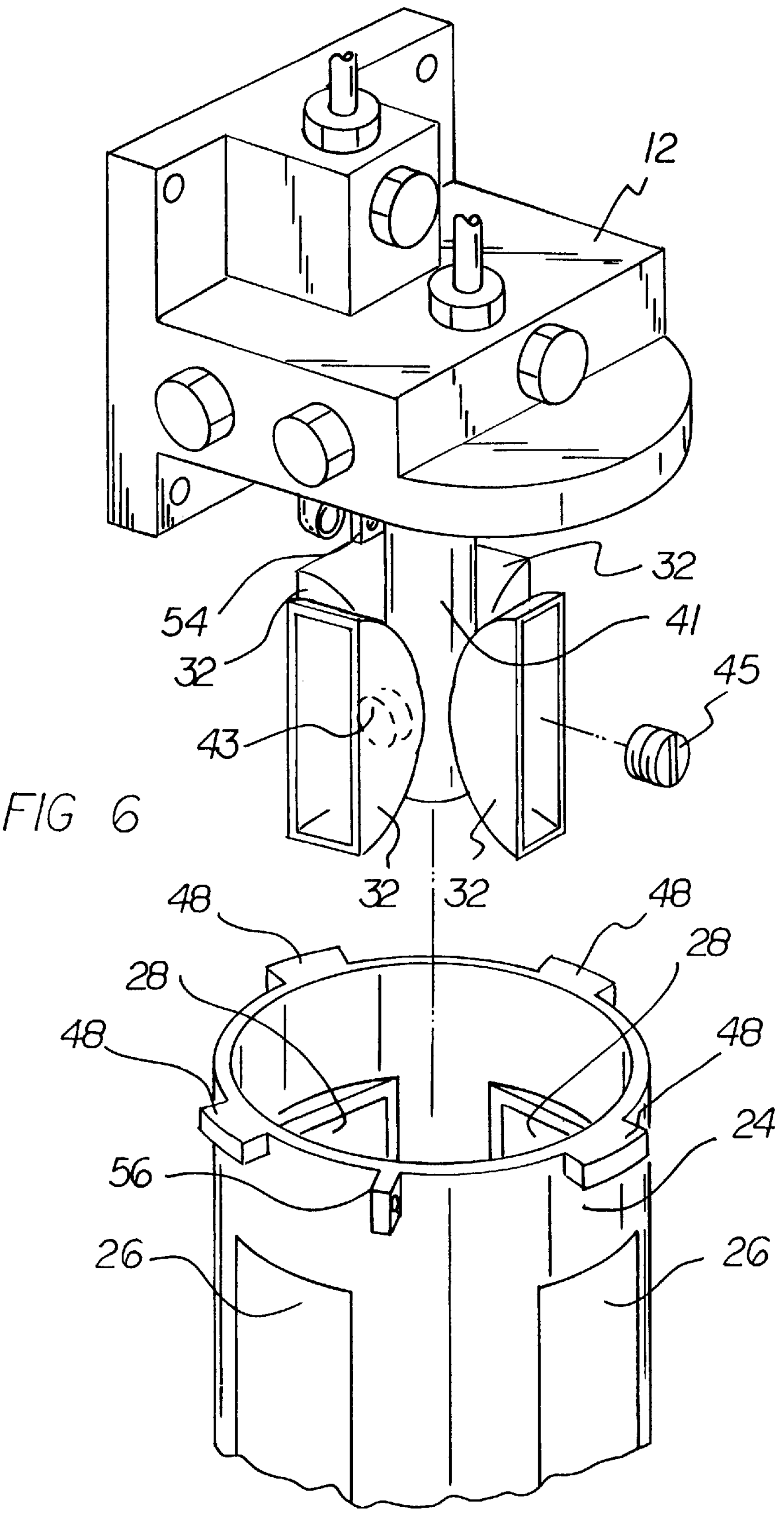
FIG. 6 is a partially exploded perspective view of the embodiment of the invention shown in FIG. 1.

Turning to FIGS. 1–6, there is shown an exemplary embodiment of the improved metal particle removal and retention apparatus of the invention generally designated by reference numeral 10. In its preferred form, the improved metal particle removal and retention apparatus 10 includes a canister-retention bracket 12, a liquid inlet channel 14 connected to the canister-retention bracket 12, a liquid outlet channel 16 connected to the canister-retention bracket 12, and a canister assembly 18 connected to the canister-retention bracket 12. The canister assembly 18 is in communication with the liquid inlet channel 14 and the liquid outlet channel 16, and a plurality of magnet attachment assemblies 20 attached to the canister assembly 18. The canister assembly 18 includes a canister housing 24 which includes a plurality of exterior magnet-attachment-reception portions 26 which receive the respective magnet attachment assemblies 20. The canister assembly 18 includes a plurality of interior particle-reception pans 28 attached to a plurality of interior pan-reception portions 30 of the canister housing 24. The interior pan-reception portions 30 are in registration with the exterior magnet-attachment-reception portions 26. An outflow tube 41 is connected to the canister-retention bracket 12, and the outflow tube 41 is in communication with the liquid outlet channel 16. The outflow tube 41 defines an outflow reception chamber 44 contained within the canister housing 24. The outflow tube 41 includes a plurality of oil receiving apertures 43. A plurality of interior funnel elements 32 are connected to the outflow tube 41 at the respective oil receiving apertures 43. Each of the funnel elements 32 includes a relatively large diameter first end opening 34 positioned adjacent to a respective particle-reception pan 28 and is in communication with an inside region 40 of the canister housing 24. Also, each of the funnel elements 32 includes a relatively small diameter second end opening 36 in communication with a respective oil receiving aperture 43.

Each of the relatively large diameter first end openings 34 of the respective funnel elements 32 is spaced from a respective particle-reception pan 28 by a separation distance 29. The separation distance 29 is relatively small. As a result, virtually all the oil that enters a respective funnel element 32 must pass close to a respective particle-reception pan 28 and close to a respective magnet attachment assembly 20. This being the case, the oil is exposed to relatively large magnetic fields, and particles that are attracted to those magnetic fields are retained by the respective particle-reception pans 28. Each respective particle-reception pan 28 has pan walls 31 which serve to shield the contents of the particle-reception pan 28 from flow disturbances caused by flowing oil. Therefore, once particles are retained in a respective particle-reception pan 28, the pan walls 31 help protect the retained particles from being agitated and from reentering the flowing oil.

A plurality of plug members 45 are provided for reception in the oil receiving apertures 43, wherein each of the plug members 45 is selectively employed for plugging a respective oil receiving aperture 43. Each of the oil receiving apertures 43 is internally threaded, and each of the plug members 45 is externally threaded.

The canister-retention bracket 12 includes the liquid inlet channel 14 and the liquid outlet channel 16 integrated into the canister-retention bracket 12. A liquid inlet chamber 51 within the canister-retention bracket 12 is connected to the liquid inlet channel 14. A liquid outlet chamber 53 within the canister-retention bracket 12 is connected to the liquid outlet channel 16. A canister bypass channel 55 is in the canister-retention bracket 12 and is connected between the liquid inlet chamber 51 and the liquid outlet chamber 53. The outflow reception chamber 44 in the outflow tube 41 and the liquid outlet chamber 53 in the canister-retention bracket 12 are contiguous and continuous forming a single chamber.

A canister bypass valve assembly 49 is contained within the canister bypass channel 55 for controlling liquid flow through the canister bypass channel 55 between the liquid inlet chamber 51 and the liquid outlet chamber 53. The canister bypass valve assembly 49 includes a valve seat 33 formed in the canister bypass channel 55. A check valve 35 is present adjacent to the valve seat 33, and a bias spring 37, contained in the canister bypass channel 55, is in contact with the check valve 35 urging the check valve 35 against the valve seat 33. Under normal conditions, the bias spring 37 urges the check valve 35 against the valve seat 33 so that communication between the liquid inlet chamber 51 and the liquid outlet chamber 53 through the canister bypass channel 55 is prevented. Under these normal conditions, liquid flows through the liquid inlet chamber 51 and into the canister housing 24 in which the liquid is subjected to magnetic treatment before exiting the canister housing 24 and passing through the liquid outlet chamber 53 and the liquid outlet channel 16.

However, when abnormally high back pressure is present in the liquid inlet chamber 51, the pressure exerted by the liquid in the liquid inlet chamber 51 on the check valve 35 is sufficient to overcome the bias force exerted by the bias spring 37 on the check valve 35. With such abnormal high pressure conditions, the check valve 35 is unseated from the valve seat 33, and liquid flows from the liquid inlet chamber 51 through the canister bypass channel 55 into the liquid outlet chamber 53 and out the liquid outlet channel 16, thereby bypassing the canister housing 24. In this respect, the canister bypass valve assembly 49 serves as a pressure relief valve, or blowoff valve, for the liquid inlet chamber 51. The canister assembly 18 is selectively connectable to and removable from the canister-retention bracket 12.

A canister connector is attached to the canister-retention bracket 12 and is selectively used for connecting the canister assembly 18 to and removing the canister assembly 18 from the canister-retention bracket 12. The canister connector includes a plurality of flange-reception channels in the canister-retention bracket 12.

The canister assembly 18 includes a plurality of connection flanges 48 that are received in the flange-reception channels. A clamp assembly 50 is provided for clamping the canister assembly 18 to the canister-retention bracket 12. The connection flanges 48 are distributed around a circumferential top edge of the canister assembly 18. The flange-reception channels are distributed on the canister-retention bracket 12 is a circular pattern. The flange-reception channels are registrable with the connection flanges 48. Each of the flange-reception channels has a circular length which is at least twice a circular length of a respective connection flange 48. Each of the flange-reception channels includes an open flange-reception portion 47 for receiving a respective connection flange 48 and a closed flange reception portion 46 for securing the respective connection flange 48 to the canister-retention bracket 12.

The clamp assembly 50 includes a first clamp tang 54 projecting from the canister-retention bracket 12. A second clamp tang 56 projects from the canister housing 24. The first clamp tang 54 and the second clamp tang 56 are in registration when the canister-retention bracket 12 and the canister assembly 18 are connected together with a sealed connection. A clamping screw 58 is provided for bonding the first clamp tang 54 and the second clamp tang 56 together to retain the canister-retention bracket 12 and the canister assembly 18 together in a sealed connection.

A sealing ring 52 is placed between the canister assembly 18 and the canister-retention bracket 12 for providing a seal between the canister assembly 18 and the canister-retention bracket 12.

To use the metal particle removal and retention apparatus 10 of the invention, attachment bolts 60 are used to attach the canister-retention bracket 12 to a vehicle structure (not shown). The liquid used is motor oil, and an inlet fitting 15 is connected to an oil inlet hose 17, and these form part of the liquid inlet channel 14 that brings oil into the canister assembly 18. An outlet fitting 19 is connected to an oil outlet hose 21, and these form part of the liquid outlet channel 16 that takes oil away from the canister assembly 18.

As shown in the drawings, there are four sets of components placed in registration. Each registered set of components includes a magnet attachment assembly 20, an exterior magnet-attachment-reception portion 26 on the canister housing 24, an interior pan-reception portion 30 on the canister housing 24, a particle-reception pan 28, a funnel element 32, and an oil receiving aperture 43 on the outflow tube 41. Each set of registered components is placed at degree intervals around the outflow tube 41. Optionally, one or more plug members 45 can be used to plug up one or more selected oil receiving apertures 43. For an oil receiving aperture 43 that is plugged up, oil will not flow from through the respective funnel element 32 into the outflow tube 41. In this respect, for an oil receiving aperture 43 that is plugged up, the respective magnet attachment assembly 20 may be removed.

More specifically, if only one magnet attachment assembly 20 is employed, the registered oil receiving aperture 43 would be left unplugged, and three oil receiving apertures 43 which are not associated with a magnet attachment assembly 20 could be plugged up. This would force oil flow to occur in the vicinity of the magnet attachment assembly 20 which is present and registered with the unplugged oil receiving aperture 43. Similarly, if two magnet attachment assemblies 20 are employed, the two registered oil receiving apertures 43 would be left unplugged, and two oil receiving apertures 43 which are not associated with a magnet attachment assembly 20 would be plugged up. This would force oil flow to occur in the vicinity of the two magnet attachment assemblies 20 which are present and registered with the unplugged oil receiving apertures 43. Similar principles apply if three or four magnet attachment assemblies 20 are employed.

In operation, oil which contains metal particles enters the liquid inlet channel 14, flows through the inflow reception chamber 51, flows into the inside region 40 of the canister assembly 18, flows into the space between the funnel element 32 and the particle-reception pan 28, flows through the funnel element 32 from the relatively large diameter first end opening 34 to the relatively small diameter second end opening 36, flows into the outflow reception chamber 44, and flows out from the liquid outlet channel 16 into the outlet hose 21. In its flow path through the canister assembly 18, the flow of oil is slowed as it enters the space between the particle-reception pan 28 and the funnel element 32 and is slowed as it passes through the funnel element 32 from the relatively large diameter first end opening 34 to the relatively small diameter second end opening 36. As the oil flow is slowed in a respective funnel element 32, the oil is exposed to the magnetic field from the associated magnet attachment assembly 20 for a relatively long time, whereby metal particles are attracted by the magnet attachment assembly 20 and retained in the associated particle-reception pan 28. Once the oil enters the outflow reception chamber 44, the speed of oil flow increases.

To affix the canister assembly 18 to the canister-retention bracket 12, the connection flanges 48 are placed in registration and inserted into the open flange-reception portions 47 of the flange-reception channels. Then, the canister assembly 18 is rotated, whereby the connection flanges 48 enter into the closed flange reception portions 46. In this way, the connection flanges 48 are secured to the canister-retention bracket 12. To assure that the canister assembly 18 does not rotate during use, the clamp assembly 50 is used to clamp the canister assembly 18 to the canister-retention bracket 12. More specifically, once the canister assembly 18 is secured to the canister-retention bracket 12 by employing the closed flange reception portions 46 and the connection flanges 48, the first clamp tang 54 and the second clamp tang 56 are placed in registration, and the clamping screw 58 is used to secure the first clamp tang 54 and the second clamp tang 56 together.

To remove the canister assembly 18 from the canister-retention bracket 12, the clamping screw 58 is unscrewed and the canister assembly 18 is rotated in the opposite direction from assembly to move the connection flanges 48 into the open flange-reception portions 47, and the canister assembly 18 is lowered from the canister-retention bracket 12.

The magnet attachment assemblies 20 shown in the drawings herein can be substituted with the magnet attachment assemblies disclosed in U.S. Pat. Nos. 5,510,024, 5,879,549, and U.S. patent application Ser. No. 08/929,336, now allowed, filed Sep. 13, 1997 mentioned above. In this respect, U.S. Pat. Nos. 5,510,024, 5,879,549, and U.S. patent application Ser. No. 08/929,336, now allowed, filed Sep. 13, 1997 are incorporated herein by reference.

The components of the metal particle removal and retention apparatus of the invention can be made from inexpensive and durable oil resistant metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved metal particle removal and retention apparatus that is low in cost, relatively simple in design and operation, and which may advantageously be used to provide for obtaining greater clarification of oil than provided by the magnetic attachments to filter cartridges such as disclosed in U.S. Pat. Nos. 5,510,024 and 5,879,549. With the invention, an improved metal particle removal and retention apparatus provides an auxiliary oil filtering device which is placed between an oil pump and an oil filter cartridge. With the invention, an improved metal particle removal and retention apparatus is provided which reduces the tendency of trapped particles from becoming dislodged and reentering the oil flow. With the invention, an improved metal particle removal and retention apparatus provides for readily attaching the auxiliary oil filtering device to the body of a motor vehicle. With the invention, an improved metal particle removal and retention apparatus is provided which reduces the oil flow in a flow region wherein the magnetic lines of force of a magnet are most concentrated. With the invention, an improved metal particle removal and retention apparatus provides an auxiliary oil filtering device which can be spliced into an oil hose or metal line through which lubricating oil flows. With the invention, an improved metal particle removal and retention apparatus provides an auxiliary oil filtering device which employs magnetic means for attracting and retaining metal particles. With the invention, an improved metal particle removal and retention apparatus provides an auxiliary oil filtering device which can employ magnetic attachments such as disclosed in U.S. Pat. Nos. 5,510,024 and 5,879,549. With the invention, an improved metal particle removal and retention apparatus provides plural magnet attachment assemblies, plural interior particle-reception pans, and plural interior funnel elements.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. An improved metal particle removal and retention apparatus for use with a plurality of magnet attachment assemblies, comprising:

a canister-retention bracket, a liquid inlet channel connected to said canister-retention bracket, a liquid outlet channel connected to said canister-retention bracket, a canister assembly connected to said canister-retention bracket, wherein said canister assembly is in communication with said liquid inlet channel and said liquid outlet channel, and an outflow tube connected to said canister-retention bracket, wherein said outflow tube is in communication with said liquid outlet channel, wherein said outflow tube defines an outflow reception chamber contained within said canister housing, wherein said outflow tube includes a plurality of oil receiving apertures, and a plurality of interior funnel elements connected to said outflow tube at said respective oil receiving apertures, wherein each of said funnel elements includes a relatively large diameter first end opening positioned adjacent to a respective particle-reception pan in communication with an inside region of said canister housing, and wherein each of said funnel elements includes a relatively small diameter second end opening in communication with a respective oil receiving aperture, wherein said canister assembly includes a canister housing which includes a plurality of exterior magnet-attachment-reception portions adapted to receive respective ones of said plurality of magnet attachment assemblies, and wherein said canister assembly includes a plurality of interior particle-reception pans attached to a plurality of interior pan-reception portions of said canister housing, wherein said interior pan-reception portions are in registration with said exterior magnet-attachment-reception portions.

2. The apparatus of claim 1 wherein each of said relatively large diameter first end openings of said respective funnel elements is spaced from a respective particle-reception pan by a separation distance.

3. The apparatus of claim 1, further including:

a plurality of plug members for reception in said oil receiving apertures, wherein each of said plug members is selectively employed for plugging as respective oil receiving aperture.

4. The apparatus of claim 3 wherein:

each of said oil receiving apertures is internally threaded, and each of said plug members is externally threaded.

5. The apparatus of claim 1 wherein said canister-retention bracket includes said liquid inlet channel and said liquid outlet channel integrated into said canister-retention bracket.

6. The apparatus of claim 1, further including:

a liquid inlet chamber within said canister-retention bracket connected to said liquid inlet channel, a liquid outlet chamber within said canister-retention bracket connected to said liquid outlet channel, a canister bypass channel with said canister-retention bracket connected between said liquid inlet chamber and said liquid outlet chamber, and a canister bypass valve assembly contained within said canister bypass channel for controlling liquid flow through said canister bypass channel between said liquid inlet chamber and said liquid outlet chamber.

7. The apparatus of claim 6 wherein said canister bypass valve assembly includes:

a valve seat formed in said canister bypass channel, a check valve adjacent to said valve seat, and a bias spring, contained in said canister bypass channel, in contact with said check valve urging said check valve against said valve seat.

8. The apparatus of claim 1 wherein said canister assembly is selectively connectable to and removable from said canister-retention bracket.

9. The apparatus of claim 8, further including:

canister connector means, attached to said canister-retention bracket, for selectively connecting and removing said canister assembly from said canister-retention bracket.

10. The apparatus of claim 9 wherein:

said canister connector means include a plurality of flange-reception channels in said canister-retention bracket, said canister assembly includes a plurality of connection flanges that are received in said flange-reception channels, and a clamp assembly for clamping said canister assembly to said canister-retention bracket.

11. The apparatus of claim 10 wherein said connection flanges are distributed around a circumferential top edge of said canister assembly.

12. The apparatus of claim 10 wherein said flange-reception channels are distributed on said canister-retention bracket is a circular pattern, wherein said flange-reception channels are registrable with said connection flanges.

13. The apparatus of claim 10 wherein each of said flange-reception channels has a circular length which is at least twice a circular length of a respective connection flange.

14. The apparatus of claim 10 wherein each of said flange-reception channels includes:

an open flange-reception portion for receiving a respective connection flange, and a closed flange reception portion for securing said respective connection flange to said canister-retention bracket.

15. The apparatus of claim 10 wherein said clamp assembly includes:

a first clamp tang projecting from said canister-retention bracket, a second clamp tang projecting from said canister housing, wherein said first clamp tang and said second clamp tang are in registration when said canister-retention bracket and said canister assembly are connected together with a sealed connection, and a clamping screw for bonding said first clamp tang and said second clamp tang together to retain said canister-retention bracket and said canister assembly together in a sealed connection.

16. The apparatus of claim 1, further including:

a sealing ring placed between said canister assembly and said canister-retention bracket for providing a seal between said canister assembly and said canister-retention bracket.

17. The apparatus as defined in claim 1 further including at least one magnet attachment assembly combined with said apparatus, said at least one magnet attachment assembly being attached to at least one of said exterior magnet-attachment-reception portions of said housing.

* * * * *